Nov. 3, 1942.  E. C. READ  2,300,747
STEAM ENGINE
Filed Feb. 3, 1937  4 Sheets-Sheet 1

INVENTOR
BY Everett C. Read
John W. Michael
ATTORNEY

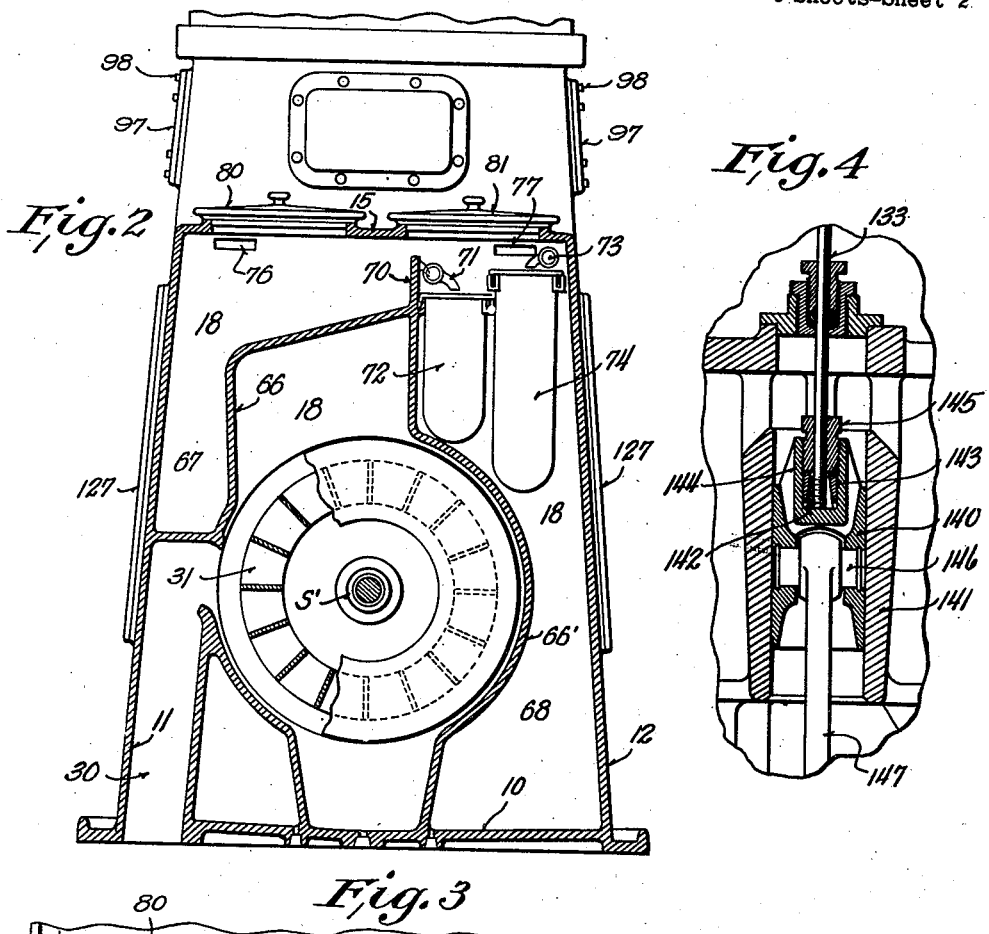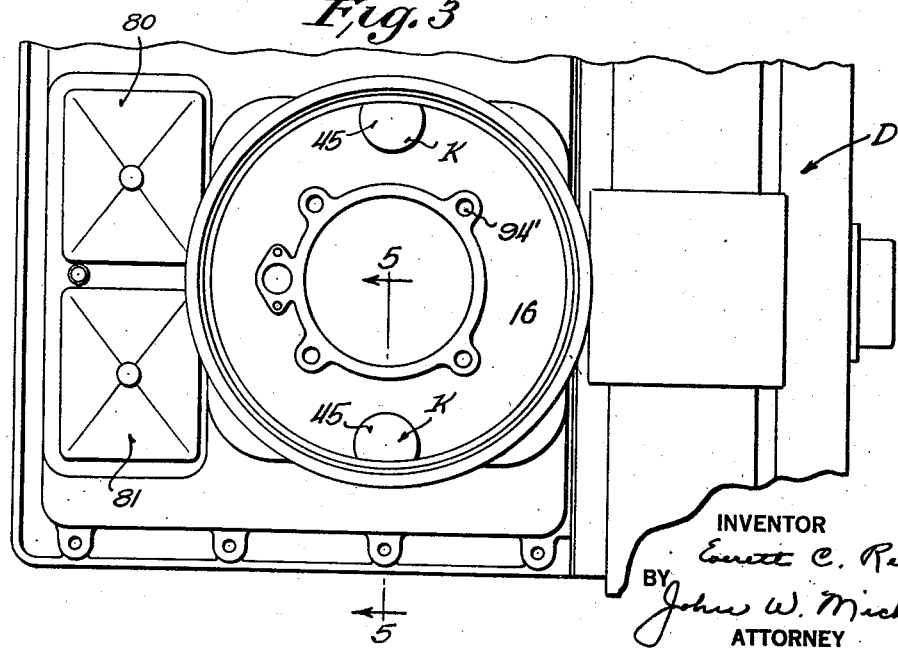

Nov. 3, 1942.　　　　　E. C. READ　　　　　2,300,747
STEAM ENGINE
Filed Feb. 3, 1937　　　　4 Sheets-Sheet 3

INVENTOR
Everett C. Read
BY
John W. Michael
ATTORNEY

Nov. 3, 1942.       E. C. READ       2,300,747
STEAM ENGINE
Filed Feb. 3, 1937       4 Sheets-Sheet 4

INVENTOR
Everett C. Read
BY John W. Michael
ATTORNEY

Patented Nov. 3, 1942

2,300,747

UNITED STATES PATENT OFFICE 2,300,747

STEAM ENGINE

Everett C. Read, Milwaukee, Wis., assignor to The Filer & Stowell Co., Milwaukee, Wis., a corporation of Wisconsin Application February 3, 1937, Serial No. 123,789

11 Claims. (Cl. 121—194)

This invention relates to an improvement in steam engines.

One of the principal objects of the present invention is to provide a steam engine which is so constructed as to provide for circulation of air through the crank case of the engine and over portions thereof radiating heat and discharging moisture in such manner as to prevent moisture condensing or cooling in the crank case and mixing with the lubricating oil therein or in the lubricating system whereby to prevent consequent emulsification of the oil and formation of sludge. In this way moisture is prevented from impairing the lubricating properties of the oil.

Another object of the invention is to provide an engine which is so constructed and organized that the operating parts thereof may be conveniently removed for inspection, replacement, or repair without dismantling the engine. For example, the piston, its piston rod, its stuffing box and guide and oil scraper box as well as the valves and their valve operating rod stuffing box and oil scraper box may be readily removed by disconnecting or backing off a few threaded parts and pulling these elements out through the top of the engine. Provision is also made for the convenient disconnection of the piston and connecting rods from the cross head.

A further object is to provide a steam engine wherein the piston and valves are positively guided in such manner that there is a clearance between the peripheral portions of the piston heads and the valve heads, the piston rings and valve rings only engaging the cylinder and liners of the valve chest respectively.

A still further object of the invention is to provide a steam engine wherein the parts are closely and compactly organized and properly positioned and alined and this in a construction which is simple and durable in its character as well as reliable and efficient in operation and easy and inexpensive to manufacture and maintain.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 2 is a fragmentary view in transverse vertical section taken on line 2—2 of Figure 1, with parts broken away shown in elevation and some parts being omitted for the sake of simplicity in illustration;

Figure 3 is a fragmentary view in top plan illustrating the crank case of the engine and the tubular or cylindrical extension thereof, the cylinder, piston and associated parts being omitted;

Figure 4 is a fragmentary detail view taken on line 4—4 of Figure 1;

Figure 1:
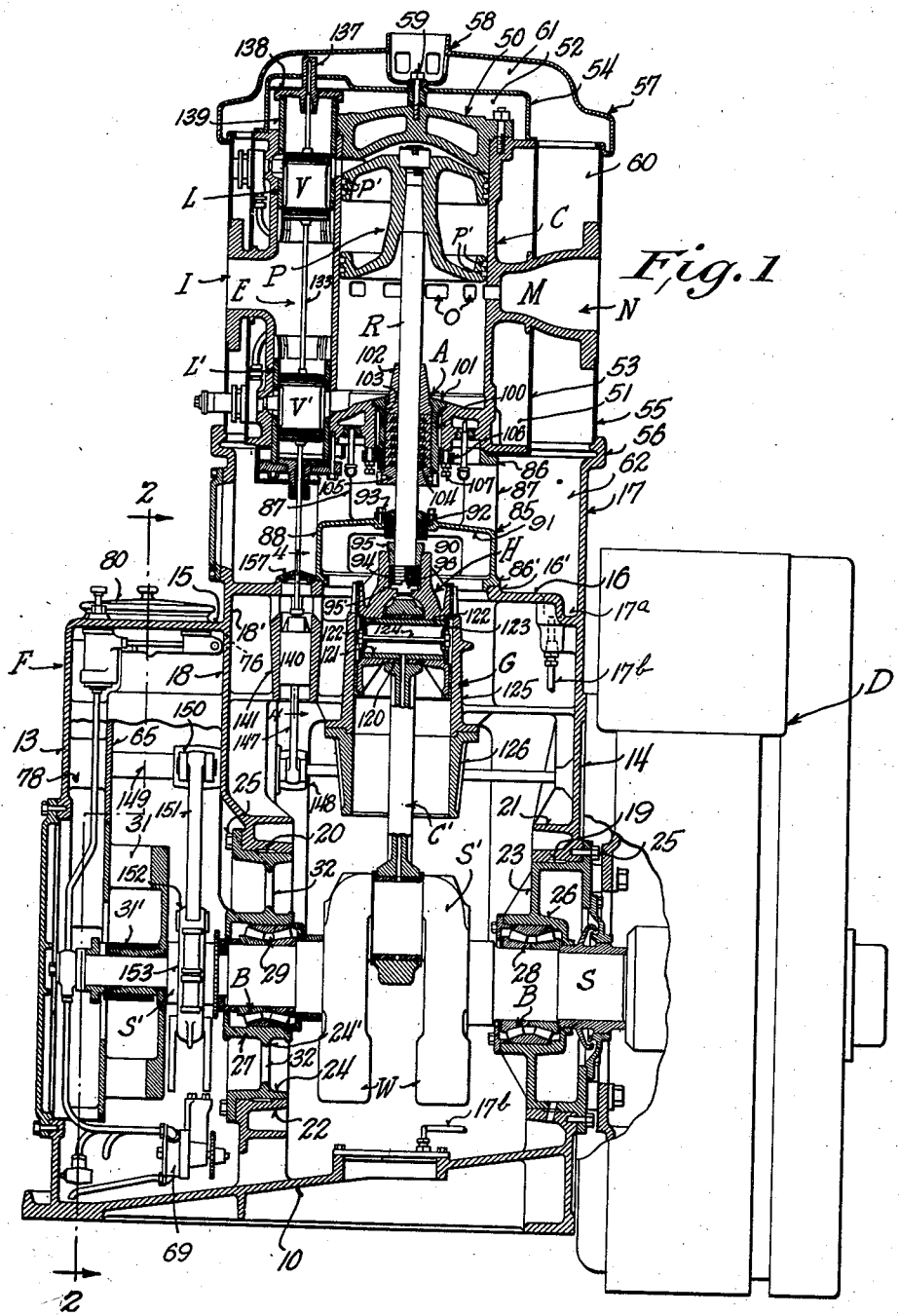
Figure 1 is a view in central vertical longitudinal section showing a steam engine constructed in accordance with the present invention, parts being shown in side elevation for the sake of simplicity in illustration.

Referring to the drawings, it will be seen that the steam engine there illustrated is shown as being of the vertical double acting reciprocating type but, as will be understood by those skilled in the art, the novel features of the present invention are applicable to various other types.

The engine shown comprises generally a frame or crank case designated at F above which the cylinder C of the engine is supported in a manner which will be hereinafter more fully described. A piston P is reciprocable in the cylinder C and has a piston rod R projecting down through a combined stuffing box and guide A and connected to a cross head H which slides in a cross head guide G supported on the crank case or frame F. A connecting rod C' connects the cross head H with a crank S' of the crank shaft S supported for rotation in anti-friction bearings B mounted in the frame or crank case F. The cylinder C is provided with a steam inlet I which communicates with the center of a valve chest E. At the upper and lower ends of the valve chest E, liners L, L' are provided. Upper and lower inlet valves V and V' are slidably fitted in the liners L and L' provided therefor in the valve chest and respectively control the supply of steam to the upper and lower ends of the cylinder C. The steam exhausts from the cylinder through exhaust ports O under the control of the piston P. The exhaust ports O communicate with an exhaust manifold M which leads to the exhaust N of the engine. The engine is shown as combined with a dynamo-electric machine D, such as an alternating or direct current generator but, of course, may be applied to any desired use.

The frame or crank case F is bolted down on a suitable foundation and has a base or bottom 10, side walls 11 and 12, end walls 13 and 14 and a top including a section 15 and a section 16. Projecting above the frame or crank case is a hollow or tubular extension 17. Within the crank case is an internal partition 18. The partition 18 has an upward extension 18' which connects the adjacent portions of the sections 15 and 16 of the top. These various portions of the crank case as well as the oil storage tanks, which will be hereinafter referred to, may all be conveniently constituted of a single piece casting.

The end wall 14 of the crank case and its internal partition 18 are provided with central openings 19 and 20 surrounded by flanged formations 21 and 22 to adapt the inner walls of the openings and the structure adjacent thereto to serve as supports for bearing carriers designated generally at 23 and 24. These bearing carriers are bolted to their respective supporting structures as indicated at 25 and are provided with sleeve-like hubs 26 and 27 in which roller bearing assemblies 28 and 29 are mounted and secured. The roller bearing assemblies 28 and 29 receive journals of the crank shaft S and thus support the crank shaft for rotation.

Adjacent the end wall 13 of the crank case an air inlet passage 30 is provided therein and receives its supply of air from a trench below the engine or from a suitable air supply tube or pipe (not shown). If desired, the air supply pipe may be provided with an air filter (not shown). The air inlet passage 30 provides for a supply of fresh air to the interior of the crank case adjacent the end wall 13 thereof. If desired, this air inlet may be disposed adjacent a fan 31 mounted on and constrained to rotate with the crank shaft S. The fan 31 shown also constitutes the inertia wheel of a governor which includes the spring 31' but as the governor forms no part of the present invention it need not be described. The fan acts to draw air in through the air inlet 30 and force it through the crank case. However, this fan is not essential and may be omitted, flow of air through the crank case being effected without the use of the fan as will hereinafter more fully and clearly appear.

The bearing carrier 24 has its web 24' provided with a series of circumferentially spaced openings 32 so that the air which flows in through the air inlet passage 30 may pass into the interior of the crank case. It will be noted that the crank shaft is equipped with counter-weights W, which, in the operation of the engine, rapidly revolve. These counter-weights and the revolving crank carry the air with it and under the influence of centrifugal force air is displaced radially in the crank case so that some of it is displaced upwardly therethrough and out through the top thereof.

Figure 5:
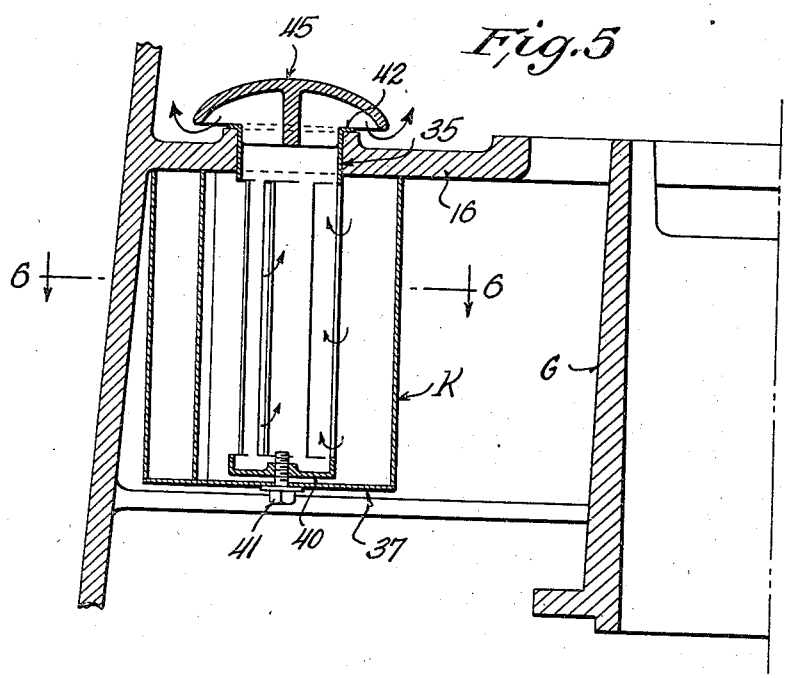
Figure 5 is a fragmentary view in vertical section taken on line 5—5 of Figure 3.

The section 16 of the top of the crank case is provided with a suitable number of openings, one of which is shown at 35 in Figure 5, so as to allow the air which is drawn into the crank case to flow up through this section 16. While these openings 35 are located a substantial distance from the region in which the oil is agitated, nevertheless an oil separator, designated generally at K, is preferably associated with each of these openings so that any oil mist or fine particles of oil which are entrained in the air will be precipitated and flow back into the crank case.

Figure 6:
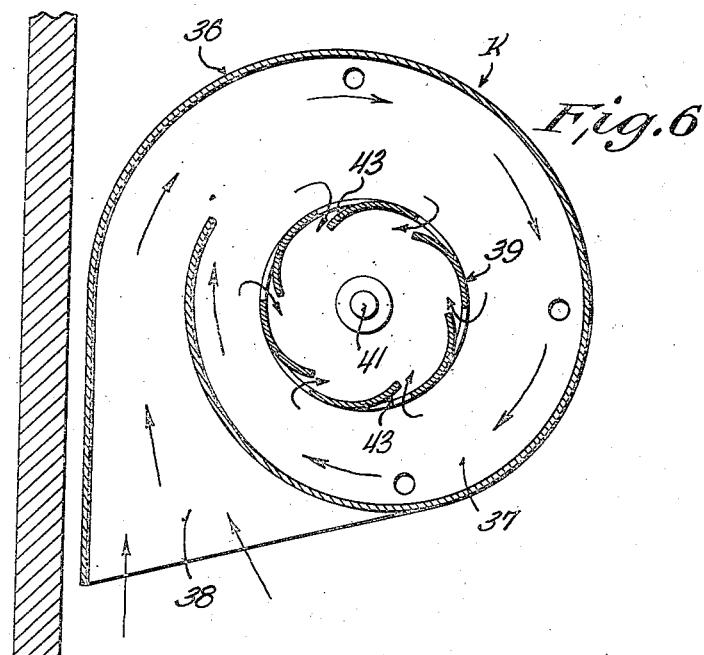
Figure 6 is a fragmentary view in horizontal section taken on line 6—6 of Figure 5.
Figure 7:
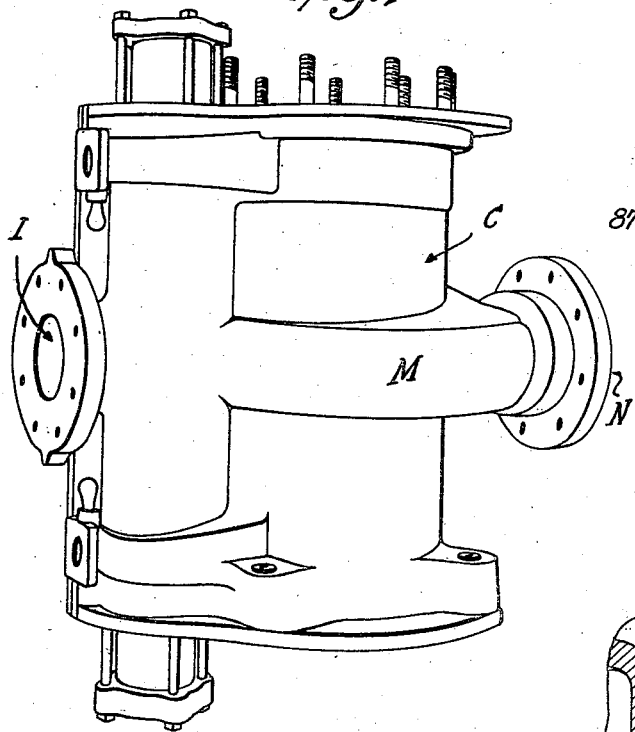
Figure 7 is a perspective view of the cylinder of the engine.
Figure 8:
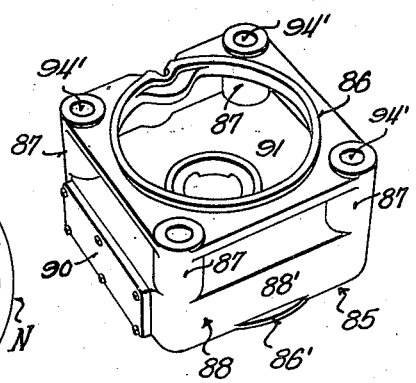
Figure 8 is a detail view of the spacer employed between the lower end of the cylinder and the crank case.
Figure 10:
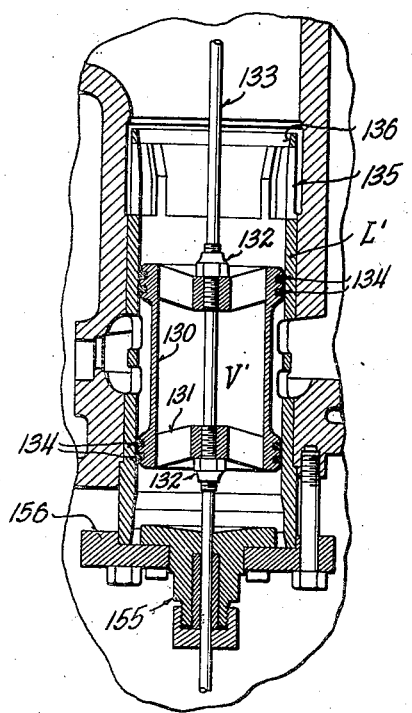
Figure 10 is a similar view of one of the steam inlet valves.
Figure 9:
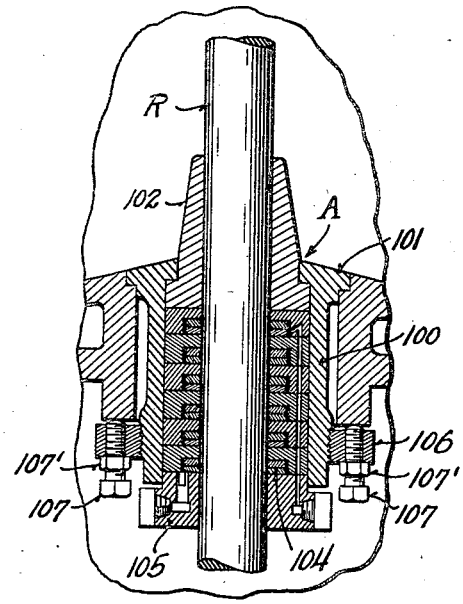
Figure 9 is a fragmentary sectional view on an enlarged scale showing the combined stuffing box and guide at the lower end of the cylinder and associated parts.

Referring now to Figures 5 and 6 it will be seen that each oil separator may comprise a spiral or generally helical peripheral wall 36, the upper edge of which abuts the underside of the section 16 of the top of the crank case and the lower end of which is closed by a bottom wall 37. This construction provides a tangential inlet 38 to the separator so that the air flowing thereinto is given a spiral or circular motion as indicated by the arrows in Figure 6. Within the separator is an inner shell 39 which has its lower end closed as at 40 and supported on the bottom of the separator by means of a screw 41. The upper end of the inner shell projects up through the openings 35 and has an integral flange 42 overlying the margin of this opening. Below the section 16 of the top wall of the crank case the inner shell is longitudinally and transversely slit and has inwardly depressed vanes 43 adjacent the slits so that the air flowing into the shell will have its direction of rotation reversed. This reversal of the direction of air flow naturally aids in the precipitation of the entrained oil particles or mist. A cowl or hood 45 is provided at the upper end of each inner shell 39.

The air that flows up through the oil separators continues up through the space 62 defined by the cylindrical extension 17 of the crank case and, the portion of the piston rod and associated structure extending or disposed between the stuffing box A and section 16 of the top of the crank case, including therewithin the openings 35.

The outside of the cylinder C and its upper removable end head 50 are covered by layers of insulating material 51 and 52, enclosed in sheathing 53 and 54 of sheet metal. The sheathing 53 is surrounded by an outer casing 55 concentric with the center line of the cylinder and in spaced relation to the outer surface thereof, this outer casing 55 being supported at its lower end on a flange 56 provided at the upper end of the extension 17 of the crank case. A cap or cover 57 is supported on the upper end of the outer casing 55 and is disposed in spaced relation to the sheathing 54. At the center of the cap a baffled air discharge opening 58 is provided. The fitting which provides the baffled air discharge opening may be suitably secured to the cap and is bolted as at 59 to the upper end head 50 of the cylinder. The outer casing 55 and its cap 57 coact with the sheathing 53 and 54 to provide air passages 60 and 61 around the outside of the cylinder and the top thereof. The air passage 60 communicates at its lower end with the space 62 around the exposed portion of the piston rod and at its upper end it communicates with the passage 61 which, in turn, freely communicates with the atmosphere in the manner shown and described.

With this construction, air drawn into the crank case will have its temperature raised by contact with the heated parts of the engine contained in the crank case and will flow up through the oil separators. In the space 62 this air will be further heated and will absorb any moisture which is dissipated or sent out by the exposed portion of the piston rod. The air will continue to flow up through the passage 60 where it is further heated and thence flow through the passage 61 and air outlet 58 to the atmosphere. The air circulation thus described occurs not only while the engine is running but continues, under the influence of natural draft, for some time after the engine has been shut down, inasmuch as the engine parts continue to give off heat for some time after the engine has stopped. In this way any moisture in the crank case or any moisture tending to travel thereinto is absorbed and entrained and carried out to the atmosphere. Dilution of the oil and consequent emulsification thereof or sludge formation is precluded. Hence, the lubricating properties of the oil remaining unimpaired.

From the foregoing it will be understood that natural draft alone induces flow or circulation of the air and when the engine is running the centrifugal action of the revolving counter-weights and crank supplements the natural draft effect. Furthermore, a fan or air impeller constrained to rotate with the crank shaft, or actuated in any suitable manner, may also be used.

The air not only circulated through the engine in the manner thus described but a portion thereof is also re-circulated over the oil tanks incorporated in the crank case in order to preclude condensation of moisture in these tanks and consequent contamination of the oil therein. As illustrated, especially in Figures 1 and 2, a portion of the crank case between the end wall 13 and partition 18 is partitioned off as indicated at 65, 66 and 66' to provide oil storage tanks 67 and 68. Suitable pumps, one of which is shown at 69 in Figure 1, are provided for pumping the oil from the oil sump into the oil storage tank 67. The oil rises in the tank 67 and flows over baffle 70 and then through a nozzle 71 to a filter bag 72. The bag 72 filters it and allows the filtered oil to flow into the storage tank 68. The surplus portion of the circulating oil is by-passed to a nozzle 73 and delivered to a filter bag 74 from whence it flows to the oil tank 68. The particulars of the lubricating system form no part of the present invention and hence will not be described in detail. For the purpose of the present invention it is sufficient to understand that the oil actually used or on hand to lubricate the parts of the engine is contained from time to time in the storage tanks 67 and 68. The partition 18 which coacts with the partitions 65, 66 and 66' and the other structure of the crank case to define the storage tanks 67 and 68 is provided at its upper end with slot-like ports 76 and 77 which afford communication between the interior of the crank case, that is, the portion thereof located between the partition 18 and the end wall 14, and the space which overlies the storage tanks 67 and 68. As a consequence, a portion of the air which flows up through the crank case will pass through these slots 76 and 77 and travel over the tops of the oil storage tanks and then down through a return passage 78 between the partition 65 and the end wall 13 (see Figure 1) to the fan or to the inlet located at the region of the fan, if the fan be not employed. Air so circulated absorbs and entrains any moisture in its path and prevents dilution of the oil in the storage tanks. Access to the oil storage tanks may be conveniently had by virtue of the provision of removable covers 80 and 81 in the section 15 of the top of the crank case.

It will be noted that when the engine is shut down some portion of the air at least will pass up through the return passage 78 from the inlet, cross over the top of the oil tanks and pass through the slot 76 into the crank case and thence continue upward into the engine in the manner described.

The cylinder C is supported on and in spaced relation to the section 16 of the top of the crank case by means of a spacer 85 which, while it may be integral with the crank case, is preferably in the form of a separate casting having upper and lower projecting rings 86 and 86' which telescope and interconnect with the lower end of the cylinder C and the flange 16' of the central opening of the top section 16 of the crank case respectively.

The upper ring 86 is integral with the upper end portions of four tubular corner posts 87 embodied in the construction of the spacer 85 while the lower portions of these posts 87 form integral parts of the lower box-like section 88 of the spacer. The lower ring 86' is integral with the lower open end of the box-like section 88. The ends of the box-like section 88 are closed by means of integral end walls 88' but the sides thereof are equipped with removable cover plates 90 bolted over openings or hand holes formed in the sides to provide for access to the interior thereof. A substantially horizontal wall or web 91 closes the upper end of the section 88 but is provided at its center with an oil scraper box 92 for the piston rod R. Bolts 93 releasably secure the box 92 to the top wall 91 of the lower section 88 of the spacer.

In the assembly suitable bolts (not shown) extend from the cylinder C down through the tubular posts 87 and through bolt holes 94' (see Figure 3) provided in the top section 16 of the crank case. Nuts (not shown) threaded on the lower end of the bolts releasably secure these parts assembled.

The top of the spacer 88 and also the floor of the space enclosed by the extension 17 have all surfaces draining into a trough 17ª, the low point of which has coupled thereto an outlet pipe 17ᵇ leading out through the base of the engine thereby draining off any liquid moisture that may be accumulated on these parts.

The releasable connection between the lower end of the piston rod R and the cross head H may comprise a collar 94 having an internally tapered threaded opening or bore threadedly engaged with the corresponding lower end of the piston rod R so as to be effectively fixed thereto. The collar may be fixed in any other way to the piston rod but the manner described is advantageous from the point of view of assembly. A sleeve nut 95 is loosely mounted on the rod R above the collar and in the assembly has its external threads engaged with internal threads in a socket 95' provided in the upper end of the cross head H, the lower end of nut 95 bearing down on the collar 94 in the assembly. A double key 96, which has its upper and lower keys at right angles to each other, is interfitted with key-ways in the lower end of the piston rod and in the bottom of the socket 95' to insure assembly of the piston rod and piston in proper angular relation. In this connection it will be understood that the piston rings P' of the piston are doweled in their grooves and they are so arranged that when the piston P is properly positioned the split of the rings will be vertically alined with the bridges or unbroken structure of the cylinder wall extending between the exhaust ports 0. The key 96 insures proper positioning of the piston in the assembly. The double key 96 is of such thickness as to properly and permanently position the piston rod R longitudinally with respect to the cylinder so that when the piston is fixed in proper position on the piston rod it will be properly centered longitudinally of the cylinder at both extreme positions or at both ends of the stroke of the piston there will be the same volume at both ends of the cylinder.

The combined stuffing box and guide A through which the piston rod reciprocates comprises a bushing 100 having a rabbeted flange 101 at its upper end engageable in the assembly with a similarly formed seat provided around the inner margin of the opening in the lower end head of the cylinder. The interengaging surfaces of the flange 101 and its seat are a ground fit to insure a hermetic seal in the assembly. Associated with the upper end of the bushing 100 is a sleeve-like guide 102 which has a flange 103 at its lower end engaged with an internal flange at the upper end of the bushing. Metallic packing 104 is provided below the guide sleeve 102 and is held in proper position by a follower 105 adjustably interconnected with the bushing in any suitable way. The bushing 100 projects downwardly beyond the lower end of the cylinder and its lower portion is externally threaded so as to be threadedly engaged with an internally threaded collar 106. There is a free running threaded engagement between the collar 106 and the bushing so that the collar 106 may be readily turned up on or backed off on the bushing. Lock screws 107 equipped with lock nuts 107' are threaded through the collar and bear against the lower cylinder head to firmly secure the bushing, packing and guide in position. By loosening the lock nuts and slightly backing off the screws 107 the collar may be readily spun off of the bushing to allow the bushing, packing and guide to be pulled up through the cylinder without dismantling the packing or disturbing its adjustment.

With the construction of the piston, cylinder and piston rod as described, these parts and their guides and glands may be readily removed from the top of the engine, after taking off the cover 57, the sheathing 54 containing insulation 52, by unbolting the upper end head 50, loosening the nuts 107' and the screw 107, backing off the collar 106, removing the plate 90 on spacer 85, disengaging the cap screws 93 and the sleeve nut 95, and pulling the whole assembly up out through the upper end of the engine.

With the collar 106 removed from the bushing 100, the combined stuffing box and guide A may pass readily upward through the opening in the lower end head. The fittings shown diagrammatically in Figure 1 and associated with the follower 105 for lubricating and draining the metallic packing 104, are, of course, uncoupled. It will be noted that the metallic packing embodied in the combined stuffing box and guide A has its lower rings constituted to provide scrapers adapted to scrape off any moisture from the piston rod and any such moisture scraped off is carried off by the draining fitting with which the follower of this stuffing box is equipped. The oil scraper box 92 as well as the sleeve nut 95 and its associated collar 94 also readily pass through the opening in the lower cylinder head.

Access to the nuts 107', screws 107 and collar 106 and associated parts is had by removing one of the cover plates 97 releasably secured by bolts 98 (see Figure 2) over openings or hand holes provided opposite these removable parts in both the front and rear sides of the crank case.

With the cover plate 97 removed, it is convenient to remove one of the cover plates 90 to provide for access to the sleeve nut 95.

For connecting the connecting rod C' to the cross head H the upper connecting rod bearing is provided with a floating bushing 120 in which a hollow floating wrist pin 121 is rotatably fitted. The wrist pin projects beyond the bushing 120 and its connecting rod bearing and its ends are rotatably mounted in bearings 122 provided therefor in the cross head. End discs or washers 123 engaged with the ends of the wrist pin and with shoulders on the cross head and a bolt and nut 124 between the discs 123 hold the wrist pin against endwise movement.

The cross head guide has an upper fixed section 125 and a lower removable section 126 bolted thereto. By turning the crank shaft to its lower dead center position and removing the lower section 126 of the cross head guide the wrist pin may be taken out and the connecting rod C' disconnected from the cross head. Removable cover plates 127 (see Figure 2) provide for access to the lower section of the cross head and the bolt and nuts 124 and wrist pin 121.

The combined stuffing box and guide A and the cross head H and guides 125 and 126 constrains and guides the piston rod to reciprocatory movement along an axis coaxial with the cylinder C. Clearances are provided between the peripheries of the heads of the piston P and the wall of the cylinder C, this being feasible because the positive guiding of the piston rod R to which the piston is fixed. Only the packing or piston rings P' engage the wall of the cylinder. Wear on the cylinder is reduced and liability of the cylinder being worn out of round is avoided.

The cross head H comprises a steel body portion which supplies strength with lightness and a bronze facing cast on the steel body to supply the desirable wearing qualities and reduce the friction incident to its reciprocation in its guide.

By having a floating wrist pin and a floating bushing in the connection between the cross head H and the connecting rod C', the advantages of a double oil film are realized, wear is decreased and the wrist pin and bushing stay round.

The steam inlet valves V and V' are of the piston type and of identical construction. Each of these valves has a cylindrical body portion 130 secured by spiders 131 and nuts 132 to valve rod 133 common to both of the valves. The outer periphery of each valve is spaced from the inner wall of the liner with which it coacts but adjacent its ends each valve is provided with external grooves in which packing rings 134 are fitted and secured, the packing rings having fluid tight working engagement with their liners except at the adjacent ends of the latter. The adjacent ends of the liners L and L' are slotted as at 135 to provide a double ported valve. The extremities of the adjacent ends of the liners are beveled as at 136 to facilitate assembly. However, the valves do not travel over these beveled extremities during their operation.

The upper end of the valve rod 133 is slidably interfitted with a guide 137 provided on a cap 138 detachably secured to the upper end of a sleeve 139 threadedly connected with the upper end of the valve chest.

The lower end of the valve rod 133 is releasably connected to a valve cross head 140, preferably of bronze, and slidably mounted in a guide 141 provided on the crank case F.

The releasable connection between the valve rod 133 and the cross head 140 is shown to advantage in Figure 4 and comprises an externally tapered and longitudinally split nut 142 threadedly connected with the lower end of the valve rod 133. An internally tapered collar 143 fits over the nut 142 and the two are loosely fitted in the lower unthreaded portion of a socket 144 provided in the upper end of the cross head 140. A sleeve nut 145 loosely fitted on the valve rod and threadedly interconnected with the upper portion of the socket 144 acts, when tightened down, to force the collar 143 down over the split nut 142 to contact the same into fixed relation to the valve rod 133 and also secure the valve rod to the cross head 140. By backing off the sleeve nut 145, the valve rod 133 and cross head 140 may be readily disconnected, the collar 143 and the split nut 142 over which it fits being readily pulled out of the socket 144 at such time.

The split nut 142 is so positioned on the lower end of the valve rod 133 that it (the lower end) engages the inner end of the socket 144 and in so doing properly positions the valve rod thereby centering the valves V and V' with reference to their respective ports. It follows that removal and replacement of the valves is feasible without any possibility of the valves being assembled out of adjustment.

The cover plate for the valve chest is equipped with an insulated jacket.

The cross head 140 is pivotally connected by wrist pin 146 with the upper bearing of a connecting link 147, the lower end of which is pivotally connected to the outer end of a rock lever 148 fixed to a rock shaft 149 suitably supported in the crank case. A second rock lever 150 is also fixed to rock shaft 149 and is pivotally connected to the upper end of an eccentric rod 151. An eccentric strap 152 provided at the lower end of the rod 151 embraces an eccentric 153 mounted on the crank shaft S' and rotated therewith.

In addition to the guide 137, the valve rod 133 slides through an oil scraper box 155 detachably secured to a valve chest cover 156 removably attached to the lower end of the valve chest and also through a lower guide 157 detachably secured to the section 16 of the top of the crank case. In this way the valve rod rod 133 is constrained to reciprocatory movement along an axis coincident with the axis of the liners L and L'. Consequently the heads of the pistons of the valves V and V' may be and are spaced from the inner walls of the liners, only the valve packing rings 134 engaging these liners to reduce wear and the like as in the case of the piston and cylinder.

With the inlet valves V and V' constructed and operated in this manner, they may be readily removed without dismantling the engine. After the cover 57, sheathing 54 and contained insulation 52 have been removed, the cap 138 is detached, the connection between the lower end of the valve rod 133 and the cross head 140 released, the combined packing gland and guide 155 unfastened and the lower guide 157 unscrewed, whereupon the piston valves, their valve rod and connected parts may all be removed through the top of the engine.

The releasable connections provided between the valve rod and its cross head and the piston rod and main cross head are especially advantageous with rod structures of relatively small cross section. With piston rods of larger sizes, it is feasible to directly though releasably secure the lower ends of the rods to the cross heads as by means of transverse keys or other suitable means.

As previously pointed out, circulation of air through the crank case in the manner described prevents condensation in or absorption of moisture by the lubricant to prevent impairment of its lubricating properties. Another important advantage flows from this feature in that it makes practical the use of roller bearings, or similar anti-friction bearings in an engine of this character.

Furthermore, by having the crank case or frame a single piece casting it is practical to use roller bearings and to mount them in carriers or housings which are pressed into accurately machined seats provided therefor on the frame. This one-piece construction eliminates the use of shims or of gaskets which might otherwise disturb alinements because of their compressible nature and it makes it possible to eliminate a great many adjustments which have been incorporated in other steam engines purely for the purpose of correcting such misalinements.

It has been indicated that the fan or air impeller is not essential but it may be used with substantial advantage in some instances, and, when it is employed, control over the rate of flow of the air is had by regulating the size of the air outlet, by the character and number of the oil deflectors and by baffling the air inlet to an appropriate extent.

While I have shown and described one construction in which this invention may be advantageously embodied, it is to be understood that this construction has been selected merely for the purpose of illustration or example and that various changes in the size, shape and arrangement of the parts may be made without departing from the spirit of the invention or the scope of the subjoined claims.

The invention claimed is:

1. A steam engine of the character described comprising a crank case having an air inlet and also having an air outlet in its top, a cylinder supported above said crank case and means defining an enclosed space around the sides and top of the cylinder, said enclosed space communicating with said outlet at its lower end and with the atmosphere at its upper end whereby air flows through the inlet, interior of the crank case, said outlets and said enclosed space to the atmosphere.

2. A steam engine of the character described comprising a crank case having an air inlet and also having an air outlet in its top, a cylinder supported above said crank case, said crank case having a tubular extension at its upper end, an outer casing having a top and coacting with said extension and said cylinder to define an enclosed space around the sides and top of the cylinder and the exposed portion of the piston rod, said top having an opening discharging to the atmosphere whereby air flows through the inlet, interior of the crank case, said outlet and said enclosed space to the atmosphere.

3. A steam engine comprising a crank case, a cylinder thereabove, a piston reciprocable in said cylinder and having a piston rod projecting downwardly therefrom, a stuffing box for said piston rod, a cross head connected to the lower end of the piston rod, a cross head guide carried by the crank case and in which the cross head is slidably fitted, a crank shaft rotatably mounted in said crank case, a connecting rod between the cross head and the crank shaft, said crank case having an air inlet, and having air outlets in its top, means defining an enclosed space around the portion of the piston rod extending between said stuffing box and the top of said crank case, including therewithin said air outlets, an outer casing having its lower end connected to and communicating with said means, and surrounding said cylinder in spaced relation thereto, and a top for said casing disposed in spaced relation to the cylinder top and having an air discharge opening whereby air drawn in through said inlet will pass up through the crank case, out through the outlets in the top thereof, through said enclosed space, then through the passages defined by said outer casing and its top and out to the atmosphere through the discharge opening thereof.

4. A steam engine of the character described comprising a crank casing having an air inlet and also having an air outlet, a cylinder supported in operative relation to said crank case, and casing means extending from the crank case and surrounding and in spaced relation to the cylinder and communicating with the air outlet and with the atmosphere whereby air flowing into said crank case through said inlet will pass through said outlet and through said casing means to the atmosphere to entrain and absorb moisture and prevent oil dilution.

5. A steam engine of the character described comprising a crank case having an air inlet and also having an air outlet in its upper portion, a cylinder supported above said crank case, and casing means extending from said crank case and surrounding and in spaced relation to the cylinder and communicating with said air outlet at its lower end and the atmosphere at its upper end whereby under the influence of natural draft air will flow into the crank case through said inlet and thence to the casing means through said outlet and from the casing means to the atmosphere to entrain and absorb moisture and prevent oil dilution.

6. A steam engine of the character described comprising a crank case having an air inlet and also having an air outlet in its top, said crank case being internally partitioned to provide oil storage tanks therein, said tanks being open at their upper ends, one of said partitions having openings therein affording communication between the interior of the crank case and the space above said tanks, there being a return air passage from the space above said tanks to the air inlet to the crank case, a cylinder supported above said crank case, and casing means extending from said crank case and surrounding and in spaced relation to said cylinder and communicating with said air outlet at its lower end and with the atmosphere at its upper end whereby air will flow through said inlet and the crank case and out through said outlet and the casing to the atmosphere, a portion of the air being recirculated through the openings of said partition, over the oil tanks and back through the return passage to the air inlet to the crank case.

7. A steam engine of the character described comprising a crank case having an air inlet and also having an air outlet in its top, said crank case being internally partitioned to provide oil storage tanks therein, said tanks being open at their upper ends, one of said partitions having openings therein affording communication between the interior of the crank case and the space above said tanks, there being a return air passage from the space above said tanks to the air inlet to the crank case, a cylinder supported above said crank case, and casing means extending from said crank case and surrounding and in spaced relation to said cylinder and communicating with said air outlet at its lower end and with the atmosphere at its upper end whereby air will flow through said inlet and the crank case and out through said outlet and the casing to the atmosphere, a portion of the air being recirculated through the openings of said partition, over the oil tanks and back through the return passage to the air inlet to the crank case, in combination with means actuated by said engine for forcing air to flow as set forth.

8. A steam engine comprising a crank case, a cylinder thereabove, a piston reciprocable in said cylinder and having a piston rod projecting downwardly therefrom, a stuffing box for said piston rod, a cross head connected to the lower end of the piston rod, a cross head guide carried by the crank case and in which the cross head is slidably fitted, a crank shaft, a connecting rod between the cross head and the crank shaft, said crank case having an air inlet, and having air outlets in its top, means defining an enclosed space around the portion of the piston rod extending between said stuffing box and the top of said crank case, including therewithin said air outlets, an outer casing having its lower end connected to and communicating with said means, and surrounding said cylinder in spaced relation thereto, and a top for said casing disposed in spaced relation to the cylinder top and having an air discharge opening whereby air drawn in through said inlet will pass up through the crank case, out through the outlets in the top thereof, through said enclosed space, then through the passages defined by said outer casing and its top and out to the atmosphere through the discharge opening thereof.

9. A steam engine comprising a crank case, a cylinder, a spacer suporting said cylinder on the crank case and having removable plates affording access to the interior of the spacer, said crank case having removable plates affording access to the plates of the spacer and to the interior of the crank case, a piston reciprocable in the cylinder and having a piston rod projecting downwardly therefrom, a combined stuffing box and guide releasably connected with the lower end of the cylinder and through which the piston rod is reciprocable, means for releasably securing said combined stuffing box and guide into position and being accessible when said crank case plates are removed, a cross head guide carried by the crank case, a cross head reciprocable therein, and a releasable connection between the cross head and the piston rod, accessible when both sets of said plates are removed, said cylinder having a removable upper end head whereby the piston, piston rod and its combined stuffing box and guide may be removed from the top of the engine.

10. A steam engine of the character described comprising a cylinder, a valve chest associated with said cylinder, a valve controlling communication between said chest and said cylinder and including a piston valve reciprocable in said chest, a valve rod connected to said piston valve, means for reciprocating said valve rod including a cross head, a guide therefor, a releasable connection between the valve rod and the cross head, a valve rod oil scraper box coacting with the valve rod and releasably secured in position, a valve chest cover plate detachably secured to the valve chest, a stuffing box for the valve rod releasably attached to the cover plate, the valve chest also having an upper removable cover plate and guide, said valve, its valve rod, stuffing box, scraper box, and parts of the releasable connection between the valve rod and the cross head being removable as a unit through the upper part of the valve chest upon removal only of said upper removable cover plate when the parts are detached and the releasable connection is released.

11. A steam engine of the character described comprising a cylinder, a valve chest associated with said cylinder, a valve controlling communication between said chest and said cylinder and including a piston valve reciprocable in said chest, a valve rod connected to said piston valve, means for reciprocating said valve rod including a cross head, a guide therefor, a releasable connection between the valve rod and the cross head including a collar adjustably connected to the lower end of the rod, said cross head having a socket provided with an inner wall against which said collar is engageable to properly position the valve rod longitudinally and thereby center the valve with respect to its ports, and means for releasably securing the valve rod and its collar to said socket.

EVERETT C. READ.